United States Patent
Kim et al.

(10) Patent No.: US 7,177,260 B2
(45) Date of Patent: **\*Feb. 13, 2007**

(54) OPTICAL PICKUP INCLUDING A MANY-SIDED REFLECTION PRISM AND METHOD OF USING THE OPTICAL PICKUP

(75) Inventors: Dae-sik Kim, Gyeonggi-do (KR); Kun-ho Cho, Gyeonggi-do (KR); Soon-kyo Hong, Seoul (KR); Young-il Kim, Gyeonggi-do (KR); Kwang-sup Im, Seoul (KR); Ho-cheol Lee, Gyeonggi-do (KR); Dae-hwan Kim, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 596 days.

This patent is subject to a terminal disclaimer.

(21) Appl. No.: 10/141,774

(22) Filed: May 10, 2002

(65) Prior Publication Data

US 2002/0181385 A1    Dec. 5, 2002

(30) Foreign Application Priority Data

May 12, 2001   (KR) ................................ 2001-26032
Sep. 29, 2001   (KR) ................................ 2001-61036

(51) Int. Cl.
*G11B 7/135*   (2006.01)
*G02B 5/04*   (2006.01)

(52) U.S. Cl. .................... 369/112.28; 359/834

(58) Field of Classification Search ........... 369/112.18, 369/112.28; 359/834; *G11B 7/135; G02B 5/04*
See application file for complete search history.

(56) References Cited

U.S. PATENT DOCUMENTS 5,135,791 A * 8/1992 Imai et al. .................. 428/64.4
5,513,164 A * 4/1996 Tanaka et al. ............. 369/53.2

(Continued)

FOREIGN PATENT DOCUMENTS

JP             06-302005       10/1994

(Continued)

OTHER PUBLICATIONS

MAT (machine assisted translation) of JP 06-302005.*

(Continued)

*Primary Examiner*—A M Psitos
(74) *Attorney, Agent, or Firm*—Stein, McEwen & Bui, LLP

(57) ABSTRACT

An optical pickup including a many-sided reflection prism formed as a single body with a plurality of reflection faces to guide a light beam incident through a transmission face in a horizontal direction perpendicular to a height direction by reducing a size of the light beam in the height direction, by using a difference in angles between the reflection faces, and to reflect the guided light beam in the height direction by one reflection face of an angle less than 45° with respect to the horizontal direction. By using the many-sided reflection prism, the height of an optical system can be reduced regardless of the wavelength used without reducing light beam size. Thereby, slim-sized optical pickups can be implemented.

73 Claims, 12 Drawing Sheets

U.S. PATENT DOCUMENTS

| | | | |
|---|---|---|---|
| 6,327,238 B1 * | 12/2001 | Nishiwaki et al. | 369/112.21 |
| 6,650,469 B2 * | 11/2003 | Kim et al. | 359/363 |
| 2002/0172133 A1 * | 11/2002 | Kim et al. | 369/112.19 |

FOREIGN PATENT DOCUMENTS

| | | |
|---|---|---|
| JP | 6-302005 | 10/1994 |
| JP | 7-21580 | 1/1995 |
| JP | 11-134701 | 5/1999 |

OTHER PUBLICATIONS

MAP (machine assisted translation) of JP 07-021580.*

* cited by examiner

OPTICAL PICKUP INCLUDING A MANY-SIDED REFLECTION PRISM AND METHOD OF USING THE OPTICAL PICKUP

CROSS-REFERENCE TO RELATED APPLICATIONS

This application claims the benefit of Korean Patent Application No. 2001-26032 filed on May 12, 2001, and Korean Patent Application No. 2001-61036 filed on Sep. 29, 2001, in the Korean Intellectual Property Office, the disclosures of which are incorporated herein by reference.

BACKGROUND OF THE INVENTION

1. Field of the Invention

The present invention relates to a many-sided reflection prism which reduces a height of an optical system and a slim, compatible optical pickup. More particularly, the present invention is directed toward an optical pickup including a many-sided reflection prism with a plurality of reflection faces to guide a light beam incident through a transmission face in a horizontal direction perpendicular to a height direction, by reducing a size of the light beam in the height direction, and by using a difference in angles between the reflection faces, and to reflect the guided light beam in the height direction by one reflection face of an angle less than 45° with respect to the horizontal direction.

2. Description of the Related Art

In general, the height of an optical pickup depends upon the effective diameter of an objective lens, i.e., the diameter of an incident light beam, the thickness of the objective lens, and the working distance of the objective lens. Therefore, to implement a compact, slim, light-weight optical pickup, there is a need to reduce the size of an objective lens and other optical elements. In particular, an optical pickup for use in optical recording/reproduction apparatuses, e.g., DVD/CD compatible optical disc drives, which are employed to provide portable personal computers with multiple and complex functions, needs to be slimmed down.

Referring to FIG. 1, a conventional optical pickup has an optical structure constructed such that a light beam traveling horizontally from a light source (not shown) is reflected by a reflection mirror 5 having a sloping reflection face 5a of 45° and then focused onto an optical disc 1 by an objective lens 3.

Recording densities are determined by the size of a light spot focused onto the recording surface of the optical disc 1 by the objective lens 3. The shorter the wavelength of light used and the larger the numerical aperture (NA) of the objective lens, the smaller the light spot. Denoting the effective diameter of a light beam incident on the objective lens 3 and the effective focal length according to the effective diameter as EPD and EFL, respectively, and the incident angle of a light beam focused onto the recording surface of the optical disc 1 as $\theta$, $NA = \sin\theta$, and $\theta = \text{Arc tan}\{EPD/(2EFL)\}$. Therefore, in order to maximize the effective numerical aperture for the purpose of minimizing the light spot size for a given condition, there is a need for an incident light beam having a diameter corresponding to the effective diameter of the objective lens 3.

The dimensions of a conventional optical pickup having the optical structure as shown in FIG. 1, in particular a thickness h in its height direction, are determined by the diameter of a light beam incident on the objective lens 3, the thickness of the objective lens 3, the thickness of an actuator (not shown) in its height direction for driving the objective lens 3, the size of the reflection mirror 5, and the inclination angle of the reflection mirror 5 with respect to the horizontal direction perpendicular to the height direction.

When there is a need to increase the size of a light beam incident on the objective lens 3 for a desired numerical aperture, the conventional optical pickup having the optical structure described above needs a reflection mirror 5 having a thickness large enough in the height direction to meet the requirement. Therefore, it is difficult to implement a compact-sized slim optical pickup.

Japanese Laid-open Patent Application No. 5-151606 discloses an optical pickup having a structure enabling slim design implementation, unlike when a reflection mirror 5 slanted at 45° is used.

Referring to FIG. 2, the conventional optical pickup disclosed in Japanese Laid-open Patent Application No. 5-151606 includes a light source 2, a collimating lens 4 which collimates a divergent beam emitted from the light source 3, a beam splitter 6 which splits an incident light beam, and a holographic reflection mirror 7 which reflects a horizontally incident light beam toward the objective lens 3.

The holographic reflection mirror 7 has a structure where a hologram 7a is formed on the reflection face of a prism 7b which is slanted at an acute angle no greater than 45° with respect to an incident light beam from the light source 2.

By using diffraction of the hologram 7a as described above, the path of an incident light beam can be perpendicularly changed by a reflection face slanted no greater than 45°. Accordingly, the thickness of an optical pickup in its height direction can be reduced, and its light intensity profile can be made uniform, compared to the case of the reflection mirror 5 slanted at 45° of FIG. 1.

However, the holographic reflection mirror 7 described above causes chromatic aberration due to the diffraction characteristics of the hologram 7a, so it cannot be applied for two wavelengths traveling on the same path. Therefore, the holographic reflection mirror 7 cannot be practically applied to compatible optical pickups using at least two wavelengths.

SUMMARY OF THE INVENTION

To solve the above-described problems, an object of the present invention is to provide an optical pickup with a many-sided reflection prism that can be applied regardless of the wavelength used and can reduce the height of an optical system, and a slim optical pickup using the many-sided reflection prism.

Additional objects and advantages of the invention will be set forth in part in the description which follows and, in part, will be obvious from the description, or may be learned by practice of the invention.

To achieve an object of the present invention, a many-sided reflection prism may be formed as a single body with a plurality of reflection faces to guide a light beam incident through a transmission face in a horizontal direction perpendicular to a height direction by reducing a size of the light beam in the height direction by using a difference in angles between the reflection faces, and to reflect the guided light beam in the height direction by one reflection face of an angle less than 45° with respect to the horizontal direction.

The many-sided reflection prism may include at least a first reflection face to reflect the light beam incident through the transmission face downward at an inclined angle with respect to the height and horizontal directions, a plurality of waveguide reflection faces to guide the light beam incident thereon by reducing the size of the light beam in the height direction, and a second reflection face that has an angle less than 45° with respect to-the horizontal direction and reflects the light beam guided by the plurality of waveguide reflection faces. The second reflection face may have an angle in the range of from about 20° to about 40° with respect to the horizontal direction. The plurality of waveguide reflection surfaces may also be parallel to each other and to the horizontal direction. Lastly, the first reflection face may reflects the light beam incident through the transmission face at an angle with respect to the horizontal direction satisfying a total reflection condition. Preferably, the first reflection face reflects the light beam incident thereon through the transmission face at an angle with respect to the height direction such that the light beam reflected from the first reflection face is incident on one waveguide reflection face at an angle satisfying the total reflection condition.

In the many-sided reflection prism, the light beam may be perpendicularly incident on the transmission face. Preferably, the distance between the plurality of waveguide reflection faces is smaller than a diameter of the light beam incident through the transmission face. The many-sided reflection prism may also be formed as a single body by molding or injection using an optically transparent material.

To achieve the above and other objects of the present invention, there is also provided an optical pickup including at least a light generation/detection unit to generate and emit a light beam and receive and detect the light beam reflected from a recording surface of a recording medium, an objective lens to form a light spot on the recording surface of the recording medium by focusing the light beam incident from the light generation/detection unit, an actuator to actuate the objective lens in a focusing and/or tracking direction, and a many-sided reflection prism, which is formed as a single body with a plurality of reflection faces, to guide the light beam incident through a transmission face from the light generation/detection unit by reducing a size of the light beam in the height direction while the light beam passes adjacent the bottom of the actuator by using a difference in angles between the reflection faces, and to reflect the guided light beam by one reflection face of an angle less than 45° with respect to a horizontal direction perpendicular to the height direction to emit the reflected light beam toward the objective lens.

The light generation/detection unit may include a light source to generate and emit a light beam of a predetermined wavelength, a photodetector to receive the light beam emitted from the light source and reflected from a recording surface of a recording medium, and an optical path changer changes to change a traveling path of the light beam such that the light beam emitted from the light source proceeds toward the recording medium and such that the light beam reflected from the recording surface of the recording medium proceeds toward the photodetector.

The optical path changer may be of a beam splitter type. Alternatively, the optical path changer may be a hologram optical element which selectively transmits straight or diffracts/transmits the light beam depending on a direction from which the light beam is incident. The light source, the photodetector, and the optical path changer may be integrated into a light module.

The light generation/detection unit may include a plurality of light sources, each of which emits a light beam of a different wavelength, a plurality of photodetectors, each of which receives the light beam emitted from one of the light sources and reflected from the recording surface of a recording medium, and an optical path changing unit to changes a traveling path of the light beam such that the light beam emitted from one of the light sources proceeds toward the recording medium and such that the light beam reflected from the recording surface of the recording medium proceeds toward a corresponding photodetector. Thus, the optical pickup may be compatible with the recording media having different formats.

The plurality of light sources may include at least a first light source to emit a light beam of a relatively short wavelength and a second light source to emit a light beam of a relatively long wavelength. The plurality of photodetectors may include a first photodetector to detect the light beam emitted from the first light source and reflected from the recording surface of a recording medium and a second photodetector to detect the light beam emitted from the second light source and reflected from the recording surface of the other recording medium. The optical path changing unit may include at least a first optical path changer to change a traveling path of the light beam emitted from the first light source, a second optical path changer to change a traveling path of the light beam emitted from the second light source, and a third optical path changer to change the traveling paths of the light beams emitted from the first and second light sources. Preferably, the first light source emits the light beam having a wavelength of about 650 nm, and the second light source emits the light beam having a wavelength of about 780 nm. The first and second optical path changers may include at least a hologram optical element which selectively transmits straight or diffracts/transmits the light beam according to the direction from which the light beam is incident, with the first light source, the first photodetector, and the first optical path changer being integrated into a light module, and the second light source, the second photodetector, and the second optical path changer being integrated into a light module. The third optical path changer may be a wavelength selective beam splitter which selectively transmits or reflects the light beams emitted from the first and second light sources according to the wavelength of the light beams.

The above and other objects of the present invention are also achieved by an optical pickup compatible with recording media having a plurality of formats, the optical pickup including a light generation/detection unit to generate and emit light beams of a plurality of wavelengths and receive and detect the light beams reflected from a recording surface of the recording media, an objective lens to form a light spot on the recording surface of a recording medium by focusing the light beam incident from the light generation/detection unit, an actuator to actuate the objective lens in a focusing and/or tracking direction, and a compound reflection prism, which includes a plurality of prisms, to guide the light beam incident from the light generation/detection unit by reducing a size of the light beam in a height direction while the light beam passes adjacent the bottom of the actuator by using a difference in angles between faces of the plurality of prisms, and to reflect the guided light beam by one face of an angle less than 45° with respect to a horizontal direction perpendicular to the height direction to emit the reflected light beam toward the objective lens.

The compound reflection prism may include a first prism having a first transmission face and a first face to reflect the light beam incident through the first transmission face downward at an inclined angle with respect to the height and horizontal directions, and a second prism having second and third faces, which are arranged in the height direction spaced a predetermined distance that is smaller than a diameter of the light beam incident on the first transmission face, to alternately reflect the light beam incident thereon after having been reflected from the first face, and a fourth face, which has an angle less than 45° with respect to the horizontal direction, to reflect the light beam incident thereon after having been reflected from the third face. Preferably, the fourth face of the second prism has an angle in the range of from about 20° to about 40° with respect to the horizontal direction. The second and third faces of the second prism may be parallel to each other. The second prism may be a rhomboidal prism, where the second, third, and fourth faces and an opposite face to the fourth face form a rhombus structure.

In addition, the compound reflection prism may also include a third prism between the first and second prisms, which allows the light beam reflected from the first face of the first prism to proceed straight and enter the second prism. The third prism may be a triangular prism having a right triangular structure.

Further, the first prism may be a triangular prism having an isosceles triangular structure oriented at a predetermined angle with respect to the horizontal direction.

Lastly, the first and second prisms may be constructed such that total internal reflection occurs at the first, second, and third faces.

BRIEF DESCRIPTION OF THE DRAWINGS

These and other objects and advantages of the present invention will become apparent and more readily appreciated from the following description of the embodiments, taken in conjunction with the accompanying drawings of which.

DETAILED DESCRIPTION OF THE PREFERRED EMBODIMENTS

Figure 1:
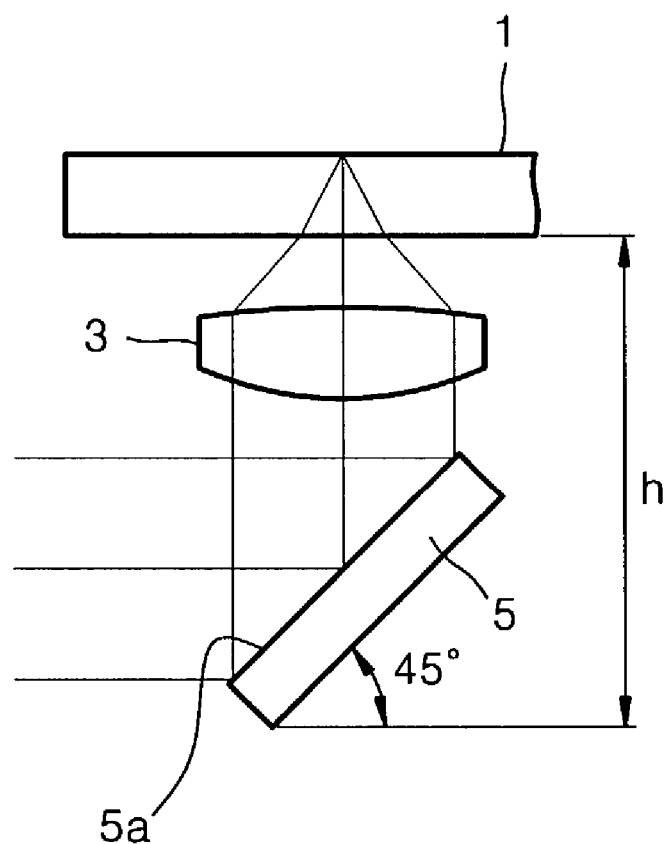
FIG. 1 is a diagram showing a conventional optical pickup.
Figure 2:
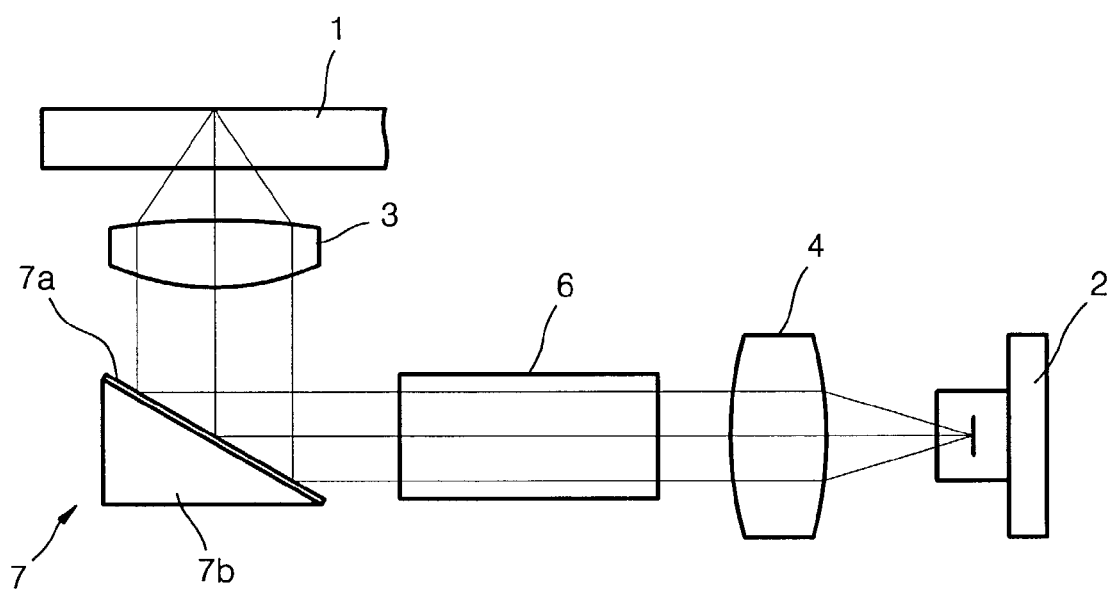
FIG. 2 is a diagram showing another conventional optical pickup.

Reference will now be made in detail to the embodiments of the present invention, examples of which are illustrated in the accompanying drawings, wherein like reference numerals refer to the like elements throughout. The embodiments are described below in order to explain the present invention by referring to the figures.

Figure 3:
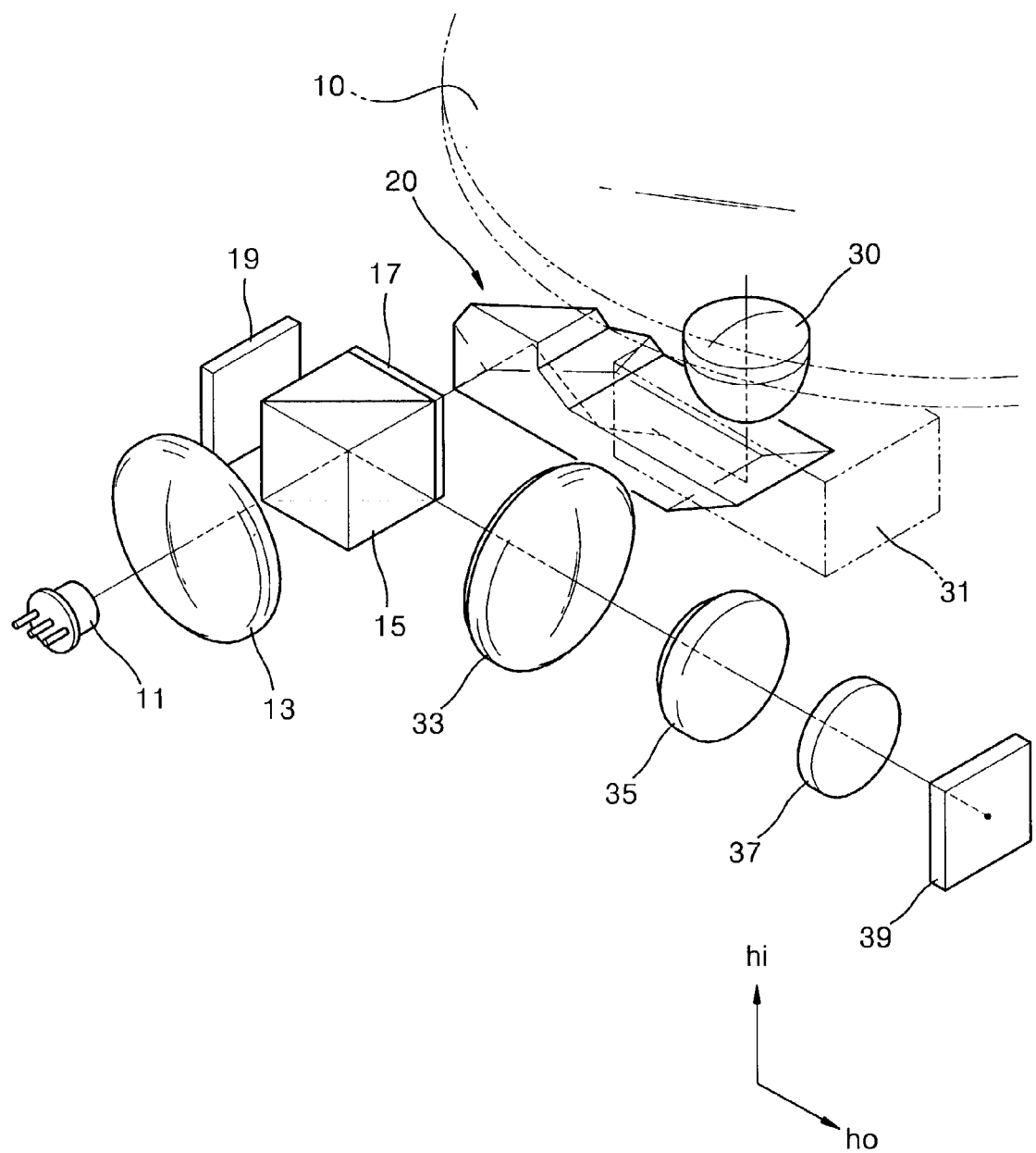
FIG. 3 is a perspective view of a first embodiment of an optical pickup using a many-sided reflection prism according to the present invention.
Figure 4:
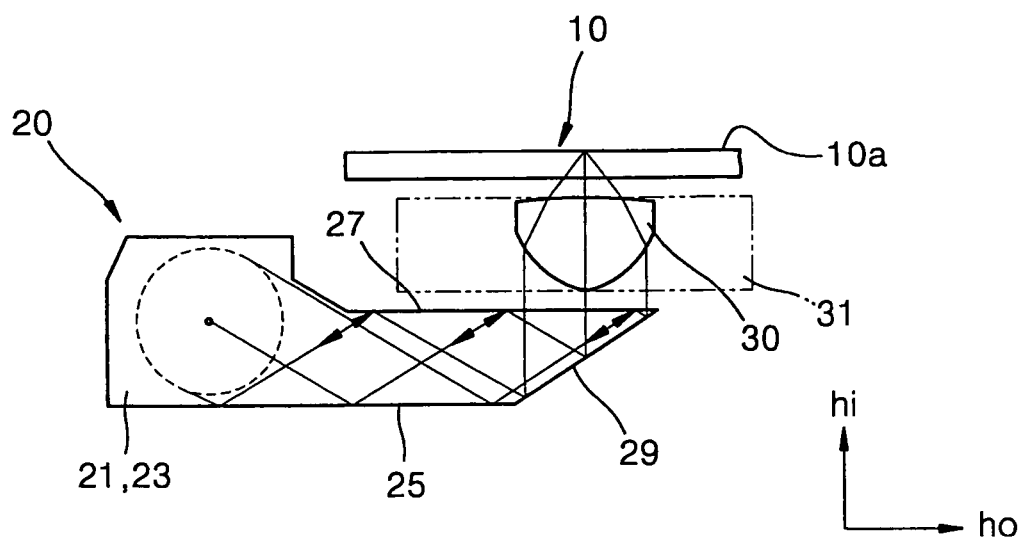
FIG. 4 is a schematic diagram showing a path of a light beam in the many-sided reflection prism of FIG. 3.

A first embodiment of an optical pickup using a many-sided reflection prism according to the present invention is shown in FIG. 3, with FIG. 4 schematically showing a path of a light beam in the many-sided reflection prism of FIG. 3.

Referring to FIGS. 3 and 4, the first embodiment of the optical pickup according to the present invention includes a light generation/detection unit that generates and emits a light beam of a predetermined wavelength and detects the light beam reflected from a recording surface 10a of a recording medium 10, an objective lens 30 that forms a light spot on the recording surface 10a of the recording medium 10 by focusing the light beam incident from the light generation/detection unit, an actuator 31 that drives the objective lens 30 in a focusing and/or tracking direction, and a many-sided reflection prism 20.

In this embodiment of the present invention, the light generation/detection unit includes a light source 11 that emits light of a predetermined wavelength and a photodetector 39 that receives the light beam reflected from the recording medium 10 and detects an information signal and an error signal.

Preferably, a semiconductor laser that emits light of a wavelength of about 650 nm or less (for example, blue wavelength) is used as the light source 11. For example, the optical pickup may include an edge emitting laser or a vertical cavity surface emitting laser as the light source 11.

The light generation/detection unit according to this embodiment of the present invention further includes an optical path changer that changes the travelling path of a light beam between the light source 11 and the many-sided reflection prism 20. As shown in FIG. 3, the optical path changer can be formed of a polarizing beam splitter 15 that transmits or reflects a light beam according to the polarization of the light beam, and a wave plate 17 that changes the polarization of the incident light beam. In this case, the wave plate 17 is formed of, preferably a quarter-wave plate with respect to a wavelength of the light beam emitted from the light source. Alternatively, the optical pickup may include a beam splitter that transmits and reflects a light beam in a predetermined ratio, as the optical path changer.

The optical pickup according to the present invention may further include a collimating lens 13 on the optical path between the light source 11 and the many-sided reflection prism 20 for collimating the divergent beam emitted from the light source 11. Where the collimating lens 13 is arranged as shown in FIG. 3, a condensing lens 33 may be further disposed on the optical path between the optical path changer and the photodetector 39 to condense the light beam reflected from the recording medium 10 and sequentially transmitted through the objective lens 30, the many-sided reflection prism 20, and the optical path changer toward the photodetector 39. An astigmatism lens unit including a cylindrical lens 35, which induces astigmatism to an incident light beam, and a yoke lens 37, which slightly diverges the incident light beam to enable the photodetector 39 to receive a light beam of an appropriate size, can be further disposed on the optical path between the optical path changer and the photodetector 39 such that a focus error signal can be detected using an astigmatism method. In FIG. 3, reference numeral 19 denotes a front photodetector for monitoring the quantity of light emitted from the light source 11.

FIG. 3 shows an example of an arrangement of optical elements as described above, which can minimize the thickness of the optical pickup according to the present invention in a particular direction (e.g., height direction hi). Here, the height direction hi refers to the direction of the optical axis of the objective lens 30.

In this embodiment of the present invention, it is preferable that the objective lens 30 has a numerical aperture (NA) of 0.6 or greater and has a working distance as short as possible, for the implementation of a slim optical pickup. The objective lens 30 is controlled in focusing and tracking directions by the actuator 31. The basic structure of the actuator 31 is well known in the technical field, and thus a detailed description and illustration will be not provided here.

Figure 5:
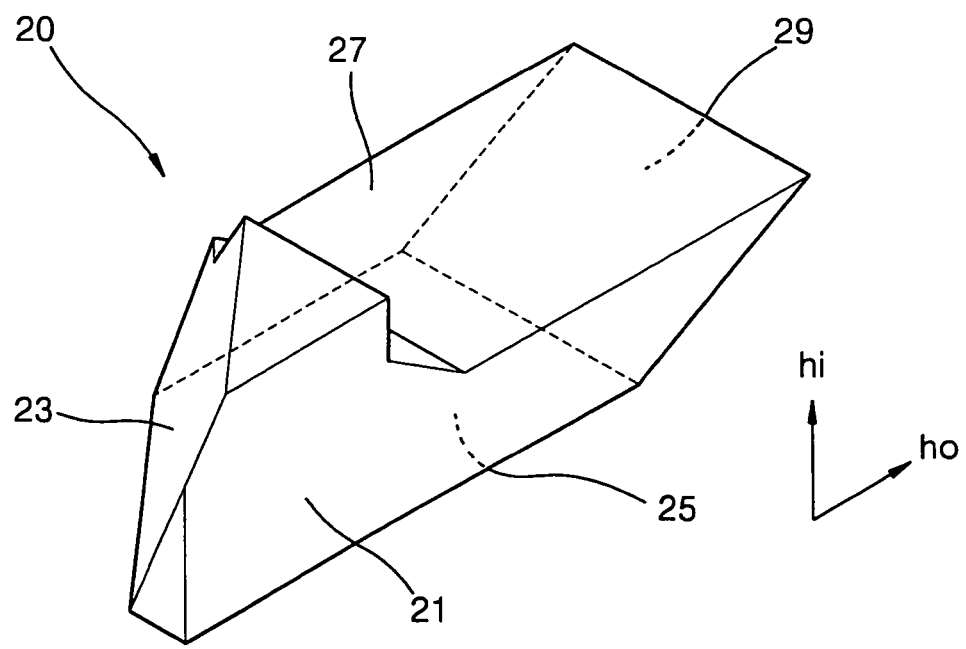
FIG. 5 is a perspective view of the many-sided reflection prism of FIG. 3.
Figure 6:
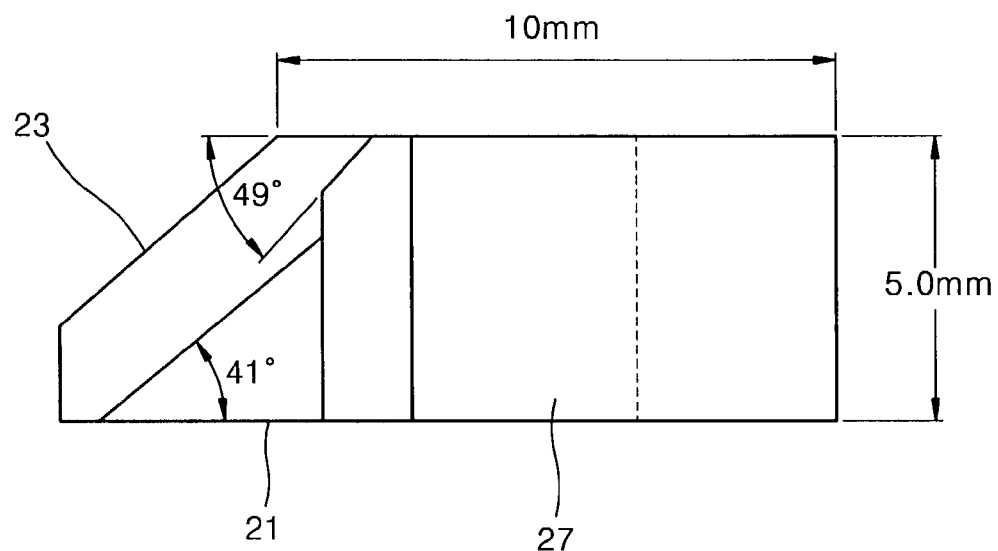
FIG. 6 is a plan view of the many-sided reflection prism of FIG. 5.
Figure 7:
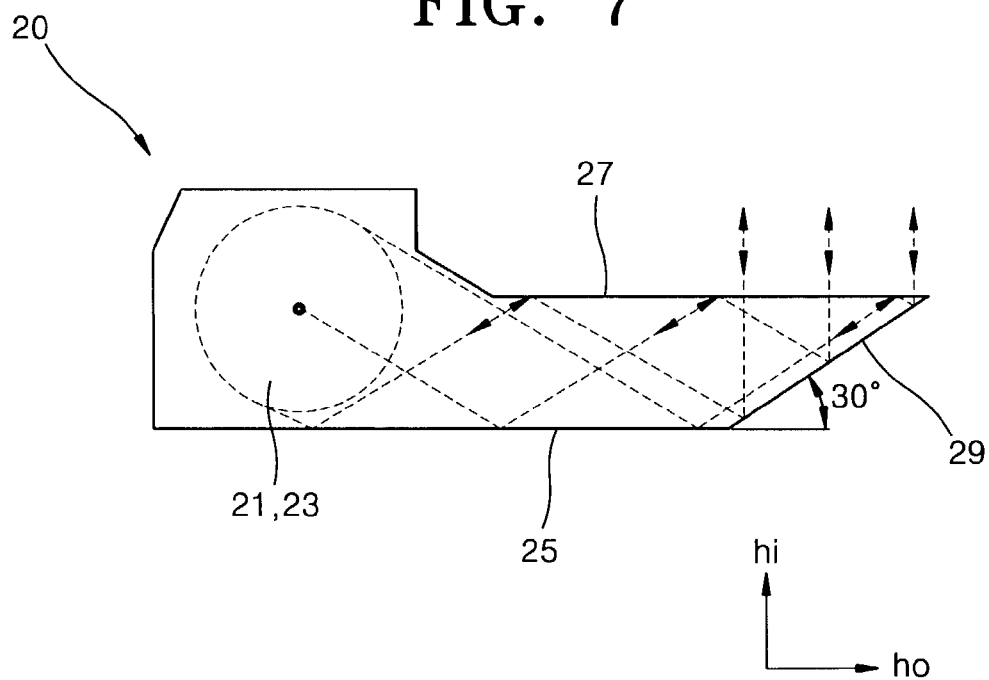
FIG. 7 is a front view of the many-sided reflection prism of FIG. 5.

FIG. 5 is a perspective view of the many-sided reflection prism 20 according to this embodiment of the present invention, with FIG. 6 being a plan view of the many-sided reflection prism 20 of FIG. 5, and FIG. 7 being a front view of the many-sided reflection prism 20 of FIG. 5.

Referring to FIGS. 4 through 7, the many-sided reflection prism 20 is formed as a single body with many reflection faces, which propagates an incident light beam from the light source 11 by reducing the size of the light beam in the height direction hi by using a difference in angles between the reflection faces, and then reflects the light beam by a reflection face having an angle less than 45° with respect to another particular direction (e.g., horizontal direction ho) perpendicular to the height direction hi to emit the light beam in the height direction hi. Here, defining the direction in which a light beam is incident from the light source 11 to the many-sided reflection prism 20 as an incident direction, the height direction hi and the horizontal direction ho are perpendicular to the incident direction. Assuming that the incident direction is parallel to the z-axis of an x-y-z orthogonal coordinates system, the horizontal direction ho and the height direction hi are parallel to the x-axis and the y-axis, respectively.

The many-sided reflection prism 20 includes a transmission face 21 on which the light beam emitted from the light source 11 is perpendicularly incident, a first reflection face 23 that reflects the light beam incident through the transmission face 21 at a predetermined angle with respect to the height direction hi and the horizontal direction ho, first and second waveguide reflection faces 25 and 27 that guide the light beam incident thereon after being reflected from the first reflection face 23 in the horizontal direction ho by alternately reflecting the same, and a second reflection face 29 that reflects the light beam incident from the second waveguide reflection face 27 in the height direction hi.

The transmission face 21 is formed such that it can transmit all of the light beam incident thereon.

The first reflection face 23 is formed such that it can reflect the incident light beam at an angle with respect to the horizontal direction ho to satisfy a total internal reflection condition and such that it can reflect the incident light beam at an angle, for example, 30±10°, with respect to the height direction hi so that the light beam reflected by the first reflection face 23 is incident on the first waveguide reflection face 25 to satisfy the total reflection condition.

For example, when the first reflection face 23 is slanted at 45° with respect to the horizontal direction ho and is formed to reflect an incident light beam at 30° with respect to the height direction hi, the light beam is reflected from the first reflection face 23 to proceed in the horizontal direction ho, slanted at about 30° with respect to the height direction hi. Accordingly, when the first waveguide reflection face 25 is parallel to the horizontal direction ho, the light beam reflected from the first reflection face 23 is incident on the first waveguide reflection face 25 at an incident angle of 60° and totally reflected by the same.

When a refractive index n1 of the medium of the many-sided reflection prism 20 is 1.5, and a refractive index n2 of the outside of the many-sided reflection prism 20, i.e., a refractive index of air, is 1, a critical incident angle at which total internal reflection from the reflection face occurs becomes 41.8°, which is calculated using formula (1) below:

$$\sin\theta = \frac{n2}{n1}. \qquad (1)$$

As described above, when the first reflection face 23 is formed such that it satisfies the condition of total reflection in the horizontal direction ho, and a light beam can be incident on the first waveguide reflection face 25 at an angle satisfying the condition of total reflection at the first waveguide reflection face 25, the light beam incident on the first reflection face 23 after perpendicularly having passed the transmission face 21 is totally reflected from the first reflection face 23, and the totally reflected light beam is incident on the first waveguide reflection face 25 at an angle satisfying the total reflection condition.

It is preferable that the first and second waveguide reflection faces 25 and 27 are parallel to each other and at the same time are parallel to the horizontal direction ho, and the second waveguide reflection face 27 is positioned above the first waveguide reflection face 25 in the height direction hi. In this case, the angle at which the light beam reflected from the first waveguide reflection face 25 is incident on the second waveguide reflection face 27 is the same as that at which the light beam from the first reflection face 23 is incident on the first waveguide reflection face 25, and thus the light beam incident on the second waveguide reflection face 27 is totally reflected, as from the first waveguide reflection face 25, and incident on the second reflection face 29.

The first and second waveguide reflection faces 25 and 27 may perform multiple reflections of the light beam to a height smaller than a diameter of the light beam incident on the transmission face 21 to guide the light beam along the horizontal direction ho. The distance in the height direction hi between the first and second waveguide reflection faces 25 and 27 facing each other may be smaller than a diameter of the light beam perpendicularly incident on the transmission face 21 from the light source 11. In this manner, when the distance between the first and second waveguide reflection faces 25 and 27 is smaller than the diameter of the incident light beam mentioned above, the light beam incident on the many-sided reflection prism 20 according to the present invention can be guided along the horizontal direction ho while being reduced in size in the height direction hi compared to the light beam perpendicularly incident on the transmission face 21, thereby enabling a height reduction of the optical pickup. Although the light beam is illustrated in FIGS. 4 and 7 as being reflected once from each of the first and second waveguide reflection faces 25 and 27, this illustration is for exemplary purpose only. The length of the first and second waveguide reflection faces 25 and 27 can be adjusted to comply with the requirement for a waveguide distance in the horizontal direction ho, so that total reflection occurs, for example, the light beam may be reflected two or more times from each of the first and second waveguide reflection faces 25 and 27. Alternatively, the structure of the optical pickup can be modified to include a plurality of first waveguide reflection faces 25 and a plurality of second waveguide reflection faces 27.

In consideration of a perpendicular light beam path change as well as the height reduction of the optical pickup, the second reflection face 29 may have an angle less than 45° with respect to the horizontal direction ho. In consideration of the total internal reflection from the first and second waveguide reflection faces 25 and 27, the second reflection face 29 may have an angle of 30±10°, i.e., from about 20° to about 40°, with respect to the horizontal direction ho. Here, the angle at which the light beam reflected from the second waveguide reflection face 27 is incident on the second reflection face 29 does not comply with the total internal reflection condition. Accordingly, it is preferable to coat the second reflection face 29 so that a light beam is totally reflected therefrom.

When the many-sided reflection prism 20 according to the present invention described above corresponds to, for example, the embodiment illustrated in FIGS. 4 through 7, the light beam is incident on the first waveguide reflection face 25 from the first reflection face 23 at an incident angle of 60°, and the second reflection face 29 is slanted at 30° with respect to the horizontal direction ho. The light beam propagating in the many-sided reflection prism 20 after having been perpendicularly incident on the transmission face 21 parallel to the incident direction is changed to be perpendicular in direction by the second reflection face 29, is perpendicularly transmitted to the second waveguide reflection face 27, and proceeds parallel to the height direction hi. Alternatively, a separate transmission face can be additionally be provided to emit the light beam reflected from the second reflection face 29 toward the objective lens 30. The variation in light beam diameter in the many-sided reflection prism 20 is as follows. For example, when the original light beam incident on the transmission face 21 from the light source 11 has a diameter of 3.8 mm, the diameter of the light beam on the first waveguide reflection face 25 becomes about 7.5 mm, which is almost twice the original. After total internal reflection from the first waveguide reflection face 25, the light beam undergoes total internal reflection from the second waveguide reflection face 27 in the same condition as from the first waveguide reflection face 25, and then is incident on the second reflection face 29. As the second reflection face 29 is slanted at 30° with respect to the horizontal direction ho, the light beam is incident on the second reflection face 29 at an incident angle of 30°. As the light beam is reflected from the second reflection face 29 the diameter of the light beam is restored to the original of 3.8 mm, and the light beam is emitted in the height direction hi. The diameter of the light beam proceeding toward the objective lens 30 after having been reflected from the second reflection face 29 can be varied by the angle of the second reflection face 29 with respect to the horizontal direction ho.

The many-sided reflection prism 20 according to the present invention described above may have the diameter of the light beam travelling through the many-sided reflection prism 20 after having been emitted from the light generation/detection unit maintained to be the same as when incident on the many-sided reflection prism 20 from the light generation/detection unit or enlarged such that the optical pickup has a minimal thickness. Also, the many-sided reflection prism 20 according to the present invention may be arranged in an optimal position.

In other words, the many-sided reflection prism 20 has a structure to guide the light beam between the first and second waveguide reflection faces 25 and 27 by reducing the size of the light beam in the height direction hi. Also, the distance between the first and second waveguide reflection faces 25 and 27 is smaller than the diameter of the light beam incident on the transmission face 21 from the light generation/detection unit. Thus, the top side of the transmission face 21 protrudes further than the second waveguide reflection face 27 in the height direction hi. Therefore, to manufacture slimmer compatible optical pickups, it is preferable that the many-sided reflection prism 20 is arranged such that only a portion corresponding to the second waveguide reflection face 29 is positioned close to the bottom of the actuator 31, and the actuator 31 is constructed for that arrangement. When the many-sided reflection prism 20 is arranged in this manner, an effective thickness of the many-sided reflection prism 20, which affects a thickness of the optical pickup, is substantially the distance between the first and second waveguide reflection faces 25 and 27. In this case, at least one portion of the objective lens 30 is positioned to be lower than a portion of the light beam emitted from the light generation/detection unit and incident on the many-sided reflection prism 20.

Here, in consideration of a preference for the light beam emitted from the many-sided reflection prism 20 toward the objective lens 30 being substantially equal to or larger in diameter than the light beam incident on the many-sided reflection prism 20, the thickness of the optimized many-sided reflection prism 20 at the first and second waveguide reflection faces 25 and 27 (i.e., the distance between the first and second waveguide reflection faces 25 and 27) is dependent upon the angle of the second reflection face 29 with respect to the horizontal direction ho. Therefore, the thickness of the optical pickup in the height direction hi is reducible according to a reduction in the angle of the second reflection face 29 with respect to the horizontal direction ho. As described above, in consideration of the total internal reflection from the first and second waveguide reflection faces 25 and 27, the angle of the second reflection face 29 with respect to the horizontal direction ho is adjustable within a range of 30±10°.

The above-described complex structure of the many-sided reflection prism 20 can be manufactured as a single body by molding or injection using a transparent material such as glass or plastic, for example. Accordingly, the many-sided reflection prism 20 according to the present invention is suited for low-cost mass production. When the many-sided reflection prism 20 is applied to an actual optical pickup, the height of the optical pickup is reduced, for example, by 30–50% of that of general optical pickups, and thus it contributes to producing slim optical recording/reproducing apparatuses.

FIG. 7 shows that when the height of an optical system determined by the diameter of the optical beam incident on the transmission face 21 is 4.3 mm, the height of the optical system below the objective lens 30 can be reduced to 2.2 mm by using the many-sided reflection prism 20 according to the present embodiment of the present invention having the second reflection face 29 slanted at 30° with respect to the horizontal direction ho. As is apparent from FIG. 7, when using the many-sided reflection prism 20, a light beam of a relatively large diameter incident on the many-sided reflection prism 20 from the light generation/detection unit passes adjacent the bottom of the actuator 31 at a distance further from the recording medium 10 (see FIG. 4) than at least a portion of the incident light beam, and is restored to the original diameter after being reflected from the second reflection face 29.

Therefore, when the many-sided reflection prism 20 described above is applied to an optical pickup, after a light beam incident on the transmission face 21 of the many-sided reflection prism 20 passes adjacent the bottom of the actuator 31 at a distance further from the recording medium 10 than at least a portion of the incident light beam, the light beam is restored to the original diameter after being reflected from the second reflection face 29 of the many-sided reflection prism 20 and enters the objective lens 30.

Figure 14:
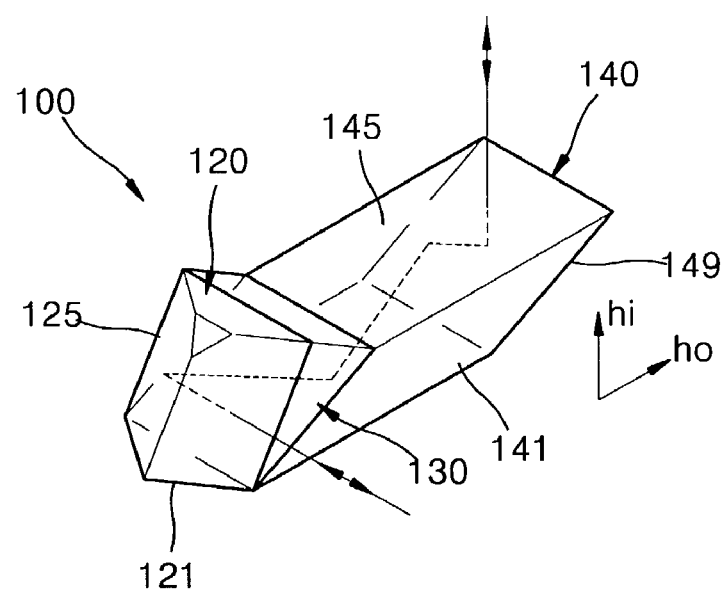
FIG. 14 is a perspective view of the compound reflection prism applied to the optical pickup of FIG. 12.

The above-described many-sided reflection prism 20 can lower the light beam incident position on the transmission face 21, compared to the compound reflection prism taught by two of the inventors of the present application in U.S. patent application Ser. No. 10/078,459 (corresponding to Korean Patent Application No. 2001-23343) and entitled "Reflection Type Compound Prism and Optical Pickup Apparatus Using the Same". Accordingly, the many-sided reflection prism 20 can further reduce the height of an optical system compared to using the compound reflection prism taught in U.S. patent application Ser. No. 10/078,459 and can ensure a greater tolerance for the light beam path in the many-sided reflection prism 20, i.e., the surrounding of the effective diameter of the light beam, in the manufacturing process. A reason that the many-sided reflection prism 20 can achieve a greater reduction in the height of the optical system, compared to when the compound reflection prism taught in U.S. patent application Ser. No. 10/078,459 is applied, is that the many-sided reflection prism 20 may be formed as a single polyhedron, such that the transmission face 21 can be extended beyond the region of the third prism (130 in FIG. 14) of the compound reflection prism taught in U.S. patent application Ser. No. 10/078,459. As a result, the light beam incident position on the many-sided reflection prism 20 can be lowered such that the base line of a light beam incident from the light source 11 almost meets the base of the many-sided reflection prism 20, i.e., the bottom side of the transmission face 21.

Propagation of a light beam emitted from the light source 11 in the optical pickup according to the first embodiment of the present invention described above will now be described below with reference to FIGS. 3 and 4.

A light beam emitted from the light source 11 is collimated by the collimating lens 13. The collimated light beam is substantially orthogonally incident on the transmission face 21 of the many-sided reflection prism 20 via the optical path changer. The light beam incident into the many-sided reflection prism 20 through the transmission face 21 undergoes total internal reflection by the first reflection face 23, travels downward at an inclined angle with respect to the horizontal direction ho, and is incident on the first waveguide reflection face 25 at an incident angle, for example, 60°, satisfying the total reflection condition. The light beam is totally reflected alternately from the first and second waveguide reflection faces 25 and 27 which are spaced apart by a predetermined distance that is smaller than the diameter of the light beam incident on the transmission face 21, so that the light beam is guided along the horizontal direction ho with a reduced size in the height direction hi. The light beam is restored to the original diameter or is enlarged to be greater than the original diameter after being reflected from the second reflection face 29 and proceeds to the objective lens 30.

The light beam is then focused as a light spot on the recording surface 10a of the recording medium 10 by the objective lens 30. The light beam reflected from the recording surface 10a is incident on the optical path changer via the objective lens 30 and the many-sided reflection prism 20 along the optical path opposite to the above, reflected by the optical path changer, and received by the photodetector 39.

Figure 8:
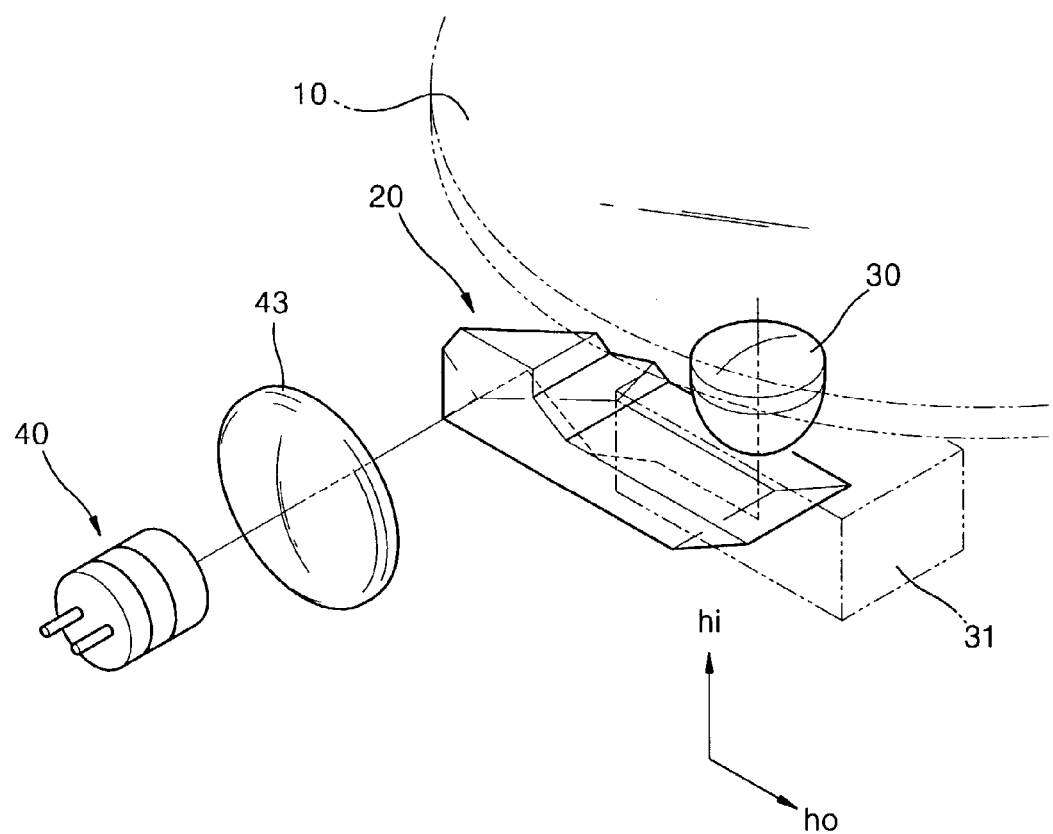
FIG. 8 is a perspective view of an optical pickup according to another embodiment of the present invention.
Figure 9:
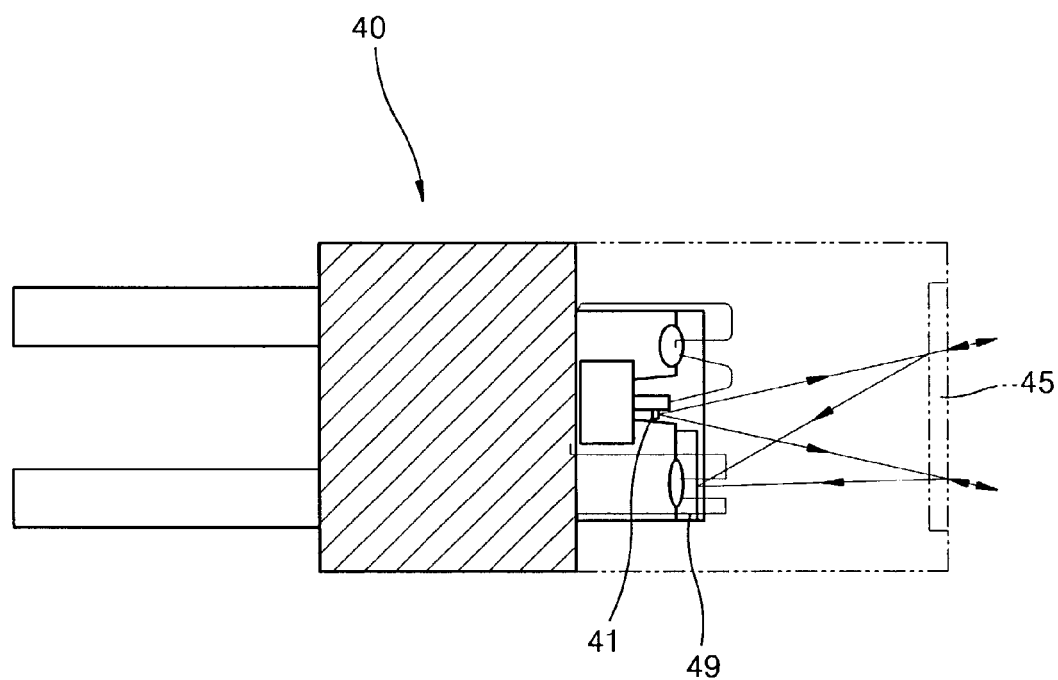
FIG. 9 is a diagram showing an example of a light module applied to the optical pickup of FIG. 8.

FIG. 8 is a perspective view of a second embodiment of an optical pickup using a many-sided reflection prism 20, with FIG. 9 being a schematic diagram of a light module of FIG. 8. In FIGS. 8 and 9, the same reference numerals as those of FIG. 3 denote the same elements as in FIG. 3, and thus descriptions thereof will be not repeated here.

Referring to FIG. 8, in the optical pickup according to the second embodiment of the present invention, the light generation/detection unit includes a single light module 40, for example, a hologram laser module having a photodetector mounted on a semiconductor laser substrate. A collimating lens 13 collimates the light beam diverging from the light module 41. As illustrated in FIG. 9, the light module 40 may include a light source 41, a hologram optical element (HOE) 45, and a photodetector 49.

When the optical pickup according to the second embodiment of the present invention is for DVDs, the light source 41 may emit a light beam of a 650-nm wavelength.

The HOE 45 acting as an optical path changer is formed to selectively transmit straight or diffract/transmit the light beam depending on the direction from which the light beam is incident. As an example, the HOE 45 directly transmits the light beam incident from the light source 41 and diffracts/transmits the light beam incident after having been reflected from the recording medium 10 so that the light beam proceeds toward the photodetector 49 mounted beside the light source 41, as shown in FIG. 9.

The light module 40 described above is well known in this technical field, and thus a detailed description thereof will be not provided here. FIG. 9 shows a structural example of the light module 40, it being noted that the structure of the light module 40 according to the present invention is not limited thereto.

When the light module 40 illustrated in FIG. 9 is used, slimmer compact optical recording/reproducing apparatuses can be implemented compared to those using the optical structure described with reference to FIG. 3.

Figure 10:
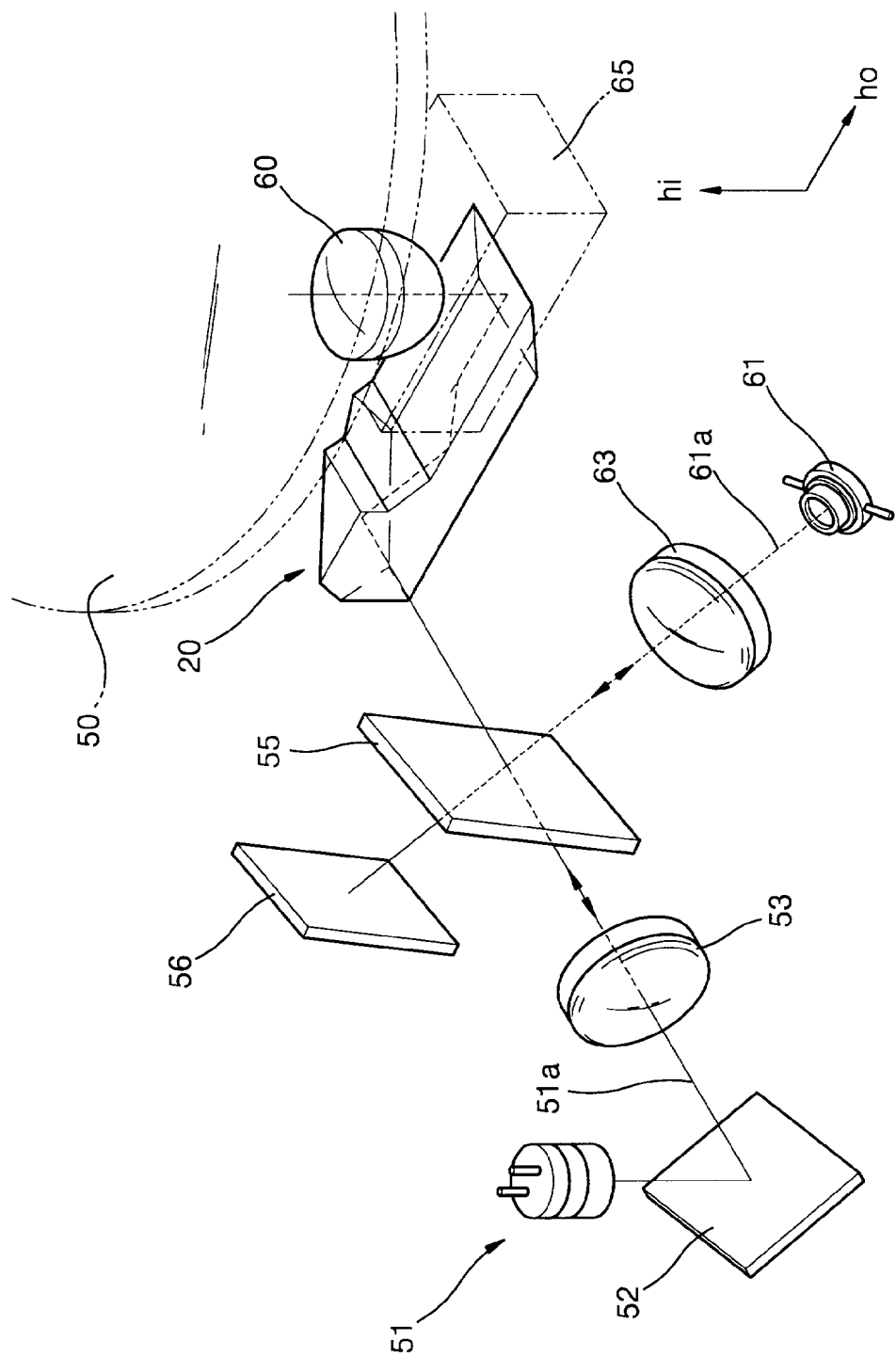
FIG. 10 is a perspective view of an optical pickup according to a further embodiment of the present invention.
Figure 11:
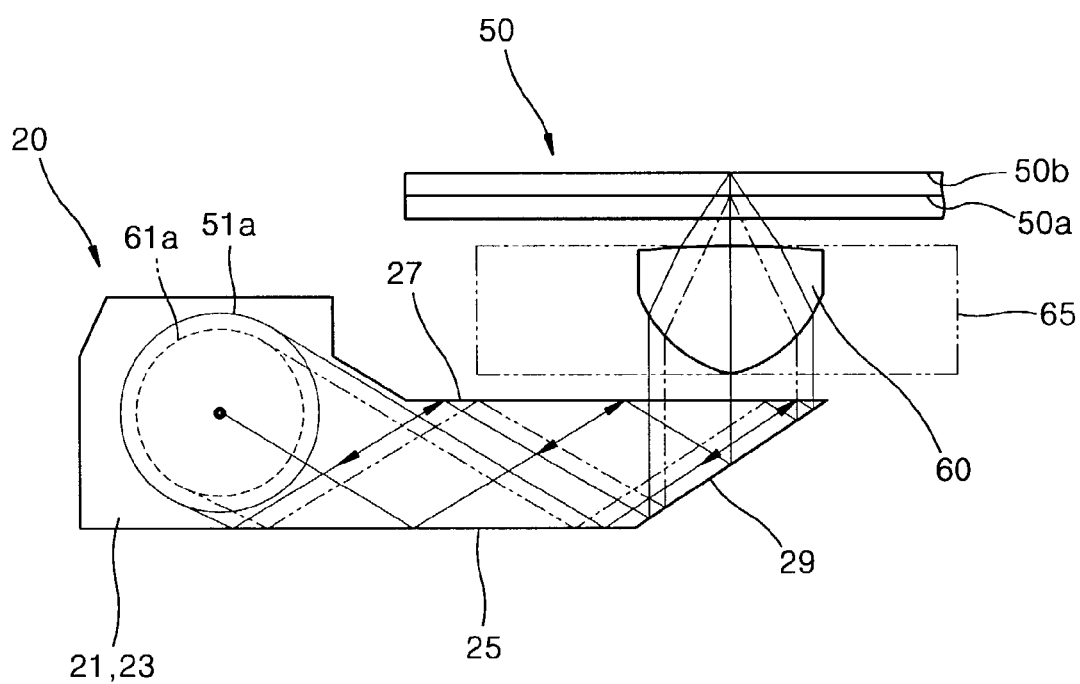
FIG. 11 is a schematic diagram showing the path of a light beam in a many-sided reflection prism of FIG. 10.

FIG. 10 is a perspective view of an optical pickup using a many-sided reflection prism 20 according to a third embodiment of the present invention, with FIG. 11 being a schematic diagram showing the path of a light beam in the many-sided reflection prism 20 of FIG. 10.

Referring to FIGS. 10 and 11, the third embodiment of the optical pickup according to the present invention has an optical structure compatible with recording media 50 having different formats, in which the light generation/detection unit includes a first light module 51, a second light module 61, and an optical path changer.

It is preferable that the first light module 51 emits a first light beam 51a having a wavelength suitable for a first recording medium 50a having a relatively small thickness. As an example, a hologram laser module for DVDs can be used as the first light module 51. In this case, a first light beam 51a of a 650-nm wavelength may be emitted from the first light module 51. It is preferable that the second light module emits a second light beam 61a having a wavelength suitable for a second recording medium 50b having a relatively large thickness. As an example, a hologram laser module for CDs can be used as the second light module 61. In this case, a second light beam 61*a* of a 780-nm wavelength may be emitted from the second light module 61. When DVD- and CD-hologram laser modules are used as the first and second light modules 51 and 61, respectively, as described above, the third embodiment of the optical pickup according to the present invention is compatible with CD family and DVD family recording media 50. Here, the detailed structures of the first and second light modules 51 and 61, except for their wavelength characteristics, can be inferred from FIG. 9, and thus descriptions thereof will be not repeated here.

In an alternative embodiment of the present invention, a wavelength selective beam splitter 55 which selectively transmits and reflects the first and second light beams 51*a* and 61*a*, emitted from the respective first and second light modules 51 and 61, depending on the wavelength and directs the first and second light beams 51*a* and 61 to enter the many-sided reflection prism 20 may be utilized as the optical path changer. As an example, the wavelength selective beam splitter 55 can be provided such that it transmits most of the first light beam 51*a* of a 650-nm wavelength emitted from the first light module 51 and totally reflects the second light beam 61*a* of a 780-nm wavelength emitted from the second light module 61. In this case, it is preferable that a front photodetector 56, which monitors the quantity of light emitted from the first light module 51 by receiving a portion of the first light beam 51*a* reflected from the wavelength selective beam splitter 55, is additionally disposed at one side of the wavelength selective beam splitter 55. The wavelength selective beam splitter 55 can be constructed such that it reflects and transmits a portion of each of the first and second light beams 51*a* and 61*a*. In this case, the front photodetector 56 can be used to monitor the quantity of light emitted from both of the first and second light modules 51 and 61.

Although the light generation/detection unit has been described and illustrated herein as including the first and second light modules 51 and 61, it will be appreciated that the light generation/detection unit is not limited to this structure and can be modified into a variety of compatible optical structures. As an example, the light generation/ detection unit of a compatible optical pickup according to the present invention may have an optical structure including, instead of the first and second light modules 51 and 61, a pair of light sources which generate and emit the first and second light beams 51*a* and 61*a* having different wavelengths, a pair of photodetectors which receive the light emitted from the pair of light sources and reflected from the recording surface of the recording medium 50, an optical path changer which changes the traveling path of the first light beam 51*a* emitted from one light source, and another optical path changer which changes the traveling path of the second light beam 61*a* emitted from the other light source. It will be appreciated that the light generation/detection unit of a compatible optical pickup according to the present invention can be modified to be compatible with more than three recording media having different thicknesses using light of more than three wavelengths.

In FIG. 10, reference numeral 52 denotes a reflection mirror, reference numeral 53 denotes a collimating lens that collimates the first light beam 51*a* diverging from the first light module 51, and reference numeral 63 denotes a collimating lens that collimates the second light beam 61*a* diverging from the second light module 61.

FIG. 10 shows an optical arrangement of the optical pickup according to the third embodiment of the present invention in which the constituent optical elements of the light generation/detection unit are arranged in such a way that the thickness of the optical pickup in the height direction hi is minimized.

In the optical pickup according to the third embodiment of the present invention, it is preferable that the objective lens 60 has an NA of 0.6 or greater and that the objective lens 60 is optimized to form a light spot on the recording surface of each of the first and second recording media 50*a* and 50*b*, having different thicknesses, without causing aberration with respect to the first and second light beams 51*a* and 61*a* having different wavelengths. In addition, to implement a slim optical pickup as in the previous embodiments, it is preferable to construct the objective lens 60 to have a working distance as short as possible. The objective lens 60 is controlled in the focusing and tracking directions by the actuator 65.

Propagation of the first and second light beams 51*a* and 61*b* emitted from the first and second light modules 51 and 61 in the optical pickup according to the third embodiment of the present invention described with reference to FIGS. 10 and 11 will now be described below.

When an optical pickup according to the third embodiment of the present invention is constructed to be compatible with CD family and DVD family recording media, and a DVD family first recording medium 50*a* is loaded, the first light module 51 is driven to emit a first light beam 51*a*. Also, when a CD family second recording medium 50*b* is loaded, the second light module 61 is driven to emit a second light beam 61*a*.

The first or second light beam 51*a* or 61*a* emitted from the first or second light module 51 or 61 is incident on the wavelength selective beam splitter 55. The first or second light beam 51*a* or 61*a* of a predetermined diameter transmitted through or reflected from the wavelength selective beam splitter 55 is substantially perpendicularly incident on the transmission face 21 of the many-sided reflection prism 20 and enters the objective lens 60 via substantially the same optical path in the many-sided reflection prism 20 as described with reference to FIG. 4. The first or second light beam 51*a* or 61*a* incident on the objective lens 60 is focused by the objective lens 60 to form a light spot on the recording surface of the first or second recording medium 50*a* or 50*b*.

The first or second light beam 51*a* or 61*a* reflected from the recording surface of the first or second recording medium 50*a* or 50*b* is incident on the wavelength selective beam splitter 55 through the objective lens 60 and the many-sided reflection prism 20 via the optical path opposite to the above and transmits through or is reflected from the wavelength selective beam splitter 55. The transmitted first light beam 51*a* or the reflected second light beam 61*a* is incident on the first or second light module 51 or 61 and diffracted/transmitted at the HOE of the first or second light module 51 or 61 so that it is received by the photodetector.

Figure 12:
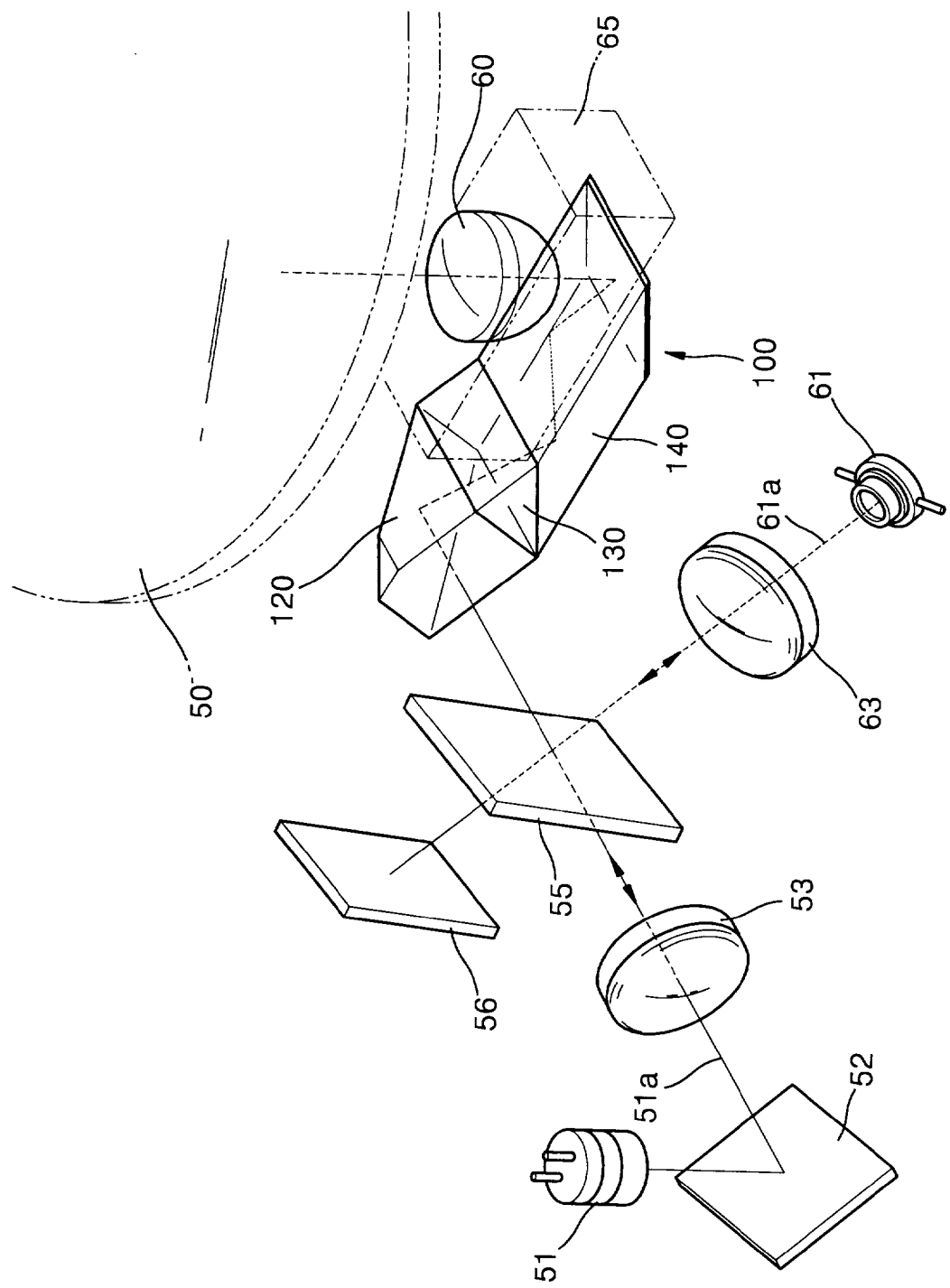
FIG. 12 is a perspective view of an optical pickup according to another embodiment of the present invention.
Figure 13:
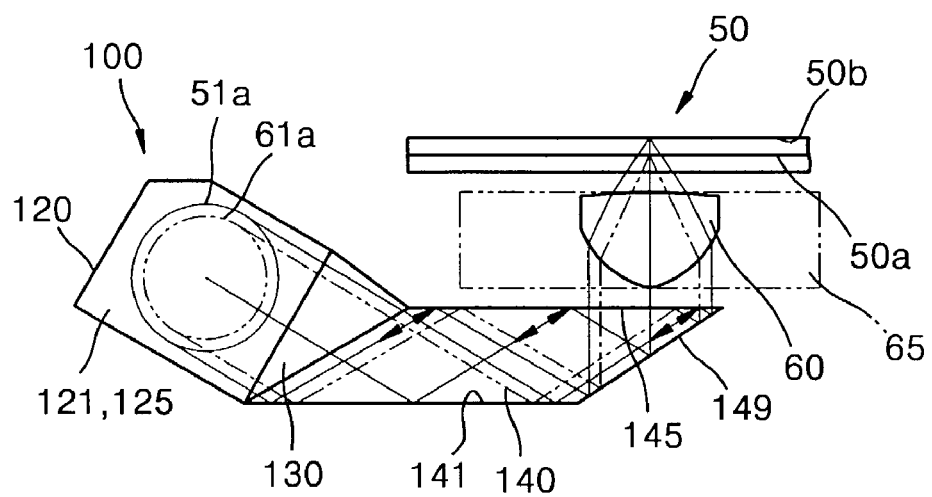
FIG. 13 is a schematic diagram showing a path of a light beam in a compound reflection prism of FIG. 12.

As shown in FIGS. 12 and 13, an optical pickup according to a fourth embodiment of the present invention, which is compatible with recording media 50 having different formats, includes a compound reflection prism 100 taught in U.S. patent application Ser. No. 10/078,459 described above, instead of the many-sided reflection prism 20 according to the present invention. In FIGS. 12 and 13, the same reference numerals as those in FIG. 10 denote the elements having substantially the same functions as those in FIG. 10, and thus descriptions thereof will be not repeated here.

As shown in FIGS. 12 through 15, the compound reflection prism 100 is constructed to include first and second prisms 120 and 140. The compound reflection prism 100 reduces the size of the first and second light beam 51a and 61a in the height direction hi, which are incident from the respective first and second light modules 51 and 61 and substantially parallel to the horizontal direction ho perpendicular to the height direction hi, by using a difference in angles between the first and second prisms 120 and 140. After guiding the first and second light beams 51a and 61a along the horizontal direction ho perpendicular to the height direction hi with a reduced size in the horizontal direction ho, the compound reflection prism 100 reflects the first and second light beams 51a and 61a by a face of the second prism 140 to emit the first and second light beams 51a and 61a in the height direction hi. In this case, it is preferable that the compound reflection prism 100 further includes a third prism 130 between the first and second prisms 120 and 140 for enabling the light beam reflected from a first face 125 of the first prism 120 to proceed straight without refraction and enter the second prism 140.

It is preferable that the first prism 120 is a triangular prism with a first transmission face 121, a first face 125 for reflecting the light beam incident through the first transmission face 121 downward at an inclined angle, and an opposite face to the second prism 140, which has an isosceles triangular structure, preferably an isosceles right triangular structure.

The first and second light beams 51a and 61a from the respective first and second light modules 51 and 61 are perpendicularly incident on the first transmission face 121. Like the first reflection face 23 of the many-sided reflection prism according to the present invention, it is preferable that the first face 125 is constructed such that it totally reflects the incident first and second light beams 51a and 61a, with respect to the horizontal direction ho, and reflects the same at an angle of, for example, 30° with respect to the height direction hi, such that total internal reflection occurs.

When the first prism 120 is constructed to have, for example, an isosceles right triangular structure, the light beam perpendicularly incident through the first transmission face 121 is incident on the first face 125 at an incident angle of 45° so that the light beam incident through the first transmission face 121 can be totally internally reflected by the first face 125.

The second prism 140 includes a second face 141 that totally internally reflects the light beam incident into the second prism 140 after having been reflected by the first face 125 of the first prism 120 upward at an inclined angle. A third face 145 is separated above from the second face 141 and totally internally reflects the light beam incident from the second face 141. The distance between the second and third faces 141 and 145 permits a reduction in the size of the light beam in the height direction hi. A fourth face 149 reflects the light beam incident thereon after having been reflected from the third face 145 in the height direction hi.

The distance between the second and third faces 141 and 145, arranged in the height direction hi facing each other, may be smaller than a diameter of the light beam incident on the first transmission face 121 of the first prism 121, as in the case of the many-sided reflection prism 20 according to the present invention. In this manner, by reducing the distance between the second and third faces 141 and 145, the size of the light beam in the height direction hi can be reduced to guide the light beam within the compound reflection prism 100 along the horizontal direction ho. It is preferable that the second and third faces 141 and 145 are parallel to each other.

It is preferable that the fourth face 149 has an angle less than 45°, preferably of 30±10° (i.e., in the range of from about 20° to about 40°), with respect to the horizontal direction ho. Due to the structure of the second prism 140, the angle at which the light beam reflected from the third face 145 is incident on the fourth face 149 fails to satisfy the total internal reflection condition. Therefore, the fourth face 149 should be coated to be a reflective surface, more preferably a totally reflective surface.

In an alternative embodiment of the present invention, it is preferable that the second prism 140 is a rhomboidal prism, where the second, third, and fourth faces 141,145 and 149 and an opposite face to the fourth face 149 form a rhombus structure.

The third prism 130 allows the light beam reflected from the first face 125 of the first prism 120 to directly travel without refraction and enter the second prism 140. The third prism 130 may be a triangular prism having a right triangular structure. When the first transmission face 121 of the first prism 120 has an approximately rectangular structure, the first prism 120 may be slanted at an angle, i.e., an angle corresponding to the vertical angle of the third prism 120 (the angle between the faces adjacent to the first and second prisms 120 and 140 ), with respect to the horizontal direction ho.

Figure 15:
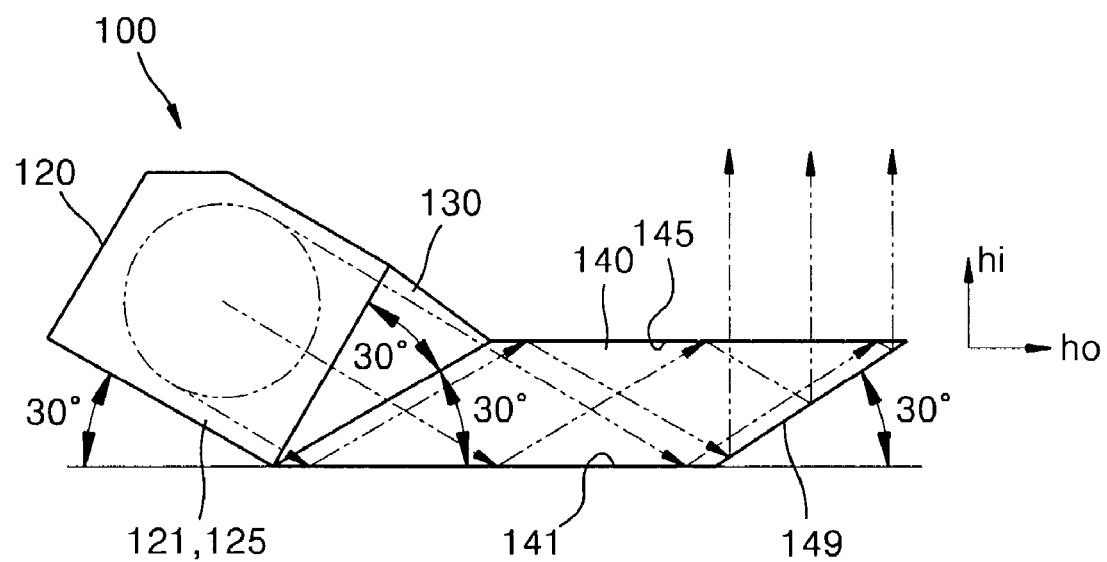
FIG. 15 is a front view of the compound reflection prism of FIG. 14.

As an example, it is assumed, as shown in FIG. 15, that the first prism 120 has a right isosceles triangular structure arranged at an inclined angle of 30° with respect to the horizontal direction ho, the third prism 130 is a triangular prism having a right triangular structure with a 30° vertical angle, and the second prism 140 is a rhomboidal prism, with the fourth face 149 having an angle of 30° with respect to the horizontal direction ho. In this case, when the light beam is perpendicularly incident on the first transmission face 121 of the first prism 120, since the first face 125 has an angle of 45° with respect to the horizontal direction ho, the light beam incident on the first face 125 from the first transmission face 121 is totally internally reflected and travels straight to enter the second prism 140. The light beam incident on the second prism 140 enters the second face 141 at an inclined angle of 30° (i.e., at an incident angle of 60°). Therefore, the incident light beam is totally internally reflected by the second face 141 and travels toward the third face 145. The light beam enters the third face 145 at an incident angle of 60°, is totally internally reflected, and travels toward the fourth face 149. The light beam enters the fourth face 149 at an incident angle of 30°. The fourth face 149 reflects the incident light beam in the height direction hi.

The compound reflection prism 100 has a structure of guiding the incident light beam between the second and third faces 141 and 145 of the second prism 140 by reducing the size of the light beam in the height direction hi. Thus, the first prism 120 of the compound reflection prism 100 protrudes further than the second prism 140 in the height direction hi. Therefore, to manufacture much slimmer compatible optical pickups, it is preferable that the compound reflection prism 100 is arranged such that the second prism 140, in particular, only a portion corresponding to the third face 145 of the second prism 140, is positioned close to the bottom of an actuator 65, and the actuator 65 is constructed for that arrangement. When the second prism 140 is arranged in this way, an effective thickness of the compound reflection prism 100, which affects a thickness of the optical pickup, is substantially the distance between the second and third faces 141 and 145. Here, at least one portion of the objective lens 60 is positioned to be lower than a portion of the light beam incident on the compound reflection prism 100 from the light generation/detection unit.

Here, in consideration of a preference for the light beam emitted from the compound reflection prism 100 toward the objective lens 60 being substantially equal to or larger in diameter than the light beam incident on the compound reflection prism 100, the thickness of the optimized compound reflection prism 100 at the second prism 140 is dependent upon the angle of the fourth face 149 with respect to the horizontal direction ho. Therefore, the thickness of the optical pickup in the height direction hi is reducible according to a reduction in the angle of the fourth face 149 with respect to the horizontal direction ho. As described above, when the compound reflection prism 100 is constructed as shown in FIG. 15, it is preferable that the fourth face 149 has an angle of 30±10° with respect to the horizontal direction ho.

When the above-described compound reflection prism 100 is used, the first and second light beams 51a and 61a, each of a relatively large diameter incident on the compound reflection prism 100 from the light generation/detection unit, pass adjacent to the bottom of the actuator 65 at a distance further from the recording medium 10 (see FIG. 13) than at least a portion of the incident light beam, and are restored to their original diameter after being reflected from the fourth face 149 of the second prism 140.

For the compound reflection prism 100 having the structure described above, for example, including the first prism 120 having an isosceles right triangular structure with the first transmission face 121 on which a light beam is incident from the light generation/detection unit and which is approximately rectangular, the second prism 140 having a rhomboidal prism structure, and the third prism 130 positioned between the first and second prisms 120 and 140, which is a triangular prism having a right triangular structure, the first and second light beams 51a and 61a are incident on a region of the first transmission face 121 considerably far away from the base of the compound reflection prism 100, i.e., its lower end parallel to the horizontal direction ho, compared to the many-sided reflection prism 20, to prohibit the first and second light beams 51a and 61b from entering a region of the third prism 130. Therefore, when the compound reflection prism 100 as described above is used, the thickness of the optical system in the height direction is slightly larger than when using the many-sided reflection prism 20 according to the present invention, but it is still slim compared to conventional optical pickups.

As described above, an optical pickup according to the above-described embodiments of the present invention has a thickness reduced by 30–50% by using the many-sided reflection prism 20 according to the present invention or the compound reflection prism 100 taught by two of the inventors of the present application in U.S. patent application Ser. No. 10/078,459, and can contribute to producing slim optical recording/reproducing apparatuses.

As the many-sided reflection prism 20 according to the present invention can be formed as a single body by molding or injection using a transparent material such as glass or plastic, the many-sided reflection prism 20 according to the present invention is suited for low-cost mass production.

According to the present invention described above, the height of the optical system can be reduced regardless of the wavelength used without reducing light beam size, and slim-sized optical pickups can be implemented.

While this invention has been particularly shown and described with reference to preferred embodiments thereof, it will be understood by those skilled in the art that various changes in form and details may be made therein without departing from the spirit and scope of the invention as defined by the appended claims and their equivalents.

What is claimed is:

1. A reflection prism formed as a single body with a plurality of reflection faces to guide a light beam incident through a transmission face of the reflection prism in a first direction perpendicular to a second direction, by reducing a size of the light beam in the second direction by using a difference in angles between reflection faces of the reflection prism, and to reflect the guided light beam in the second direction by using a reflection face of an angle less than 45° with respect to the first direction, the reflection prism comprising:

a first reflection face to reflect the light beam incident through the transmission face downward at an inclined angle with respect to the first and second directions;

a plurality of waveguide reflection faces to guide the light beam, after having been reflected from the first reflection face, by reducing the size of the light beam in the second direction; and a second reflection face, which has an angle less than 45° with respect to the first direction, to reflect the light beam guided by the plurality of waveguide reflection faces.

2. The reflection prism of claim 1, wherein the second reflection face has an angle in the range of from about 20° to about 40° with respect to the first direction.

3. The reflection prism of claim 1, wherein the plurality of waveguide reflection surfaces are parallel to each other and to the first direction.

4. The reflection prism of claim 3, wherein a distance between the plurality of waveguide reflection faces is smaller than a diameter of the light beam incident through the transmission face.

5. The reflection prism of claim 1, wherein the first reflection face reflects the light beam incident through the transmission face at an angle with respect to the first direction satisfying a total reflection condition.

6. The reflection prism of claim 5, wherein the first reflection face reflects the light beam, incident thereon through the transmission face, at an angle with respect to the second direction such that the light beam reflected from the first reflection face is incident on one waveguide reflection face at an angle satisfying the total reflection condition.

7. The reflection prism of claim 1, wherein the first reflection face reflects the light beam, incident thereon through the transmission face, at an angle with respect to the second direction such that the light beam reflected from the first reflection face is incident on one of the waveguide reflection faces at an angle satisfying the total reflection condition.

8. The reflection prism of claim 1, wherein the light beam is perpendicularly incident on the transmission face.

9. The reflection prism of claim 1, wherein the light beam is perpendicularly incident on the transmission face.

10. The reflection prism of claim 1, wherein a distance between the plurality of waveguide reflection faces is smaller than a diameter of the light beam incident through the transmission face.

11. The reflection prism of claim 1, wherein the reflection prism is an optically transparent molded or injected single-body reflection prism.

12. The reflection prism of claim 1, wherein the reflection prism is an optically transparent molded or injected single-body reflection prism.

13. The reflection prism of claim 1, wherein the plurality of waveguide reflection faces are parallel to each other and guide the light beam, after having been reflected from the first reflection face, in the first direction perpendicular to the second direction.

14. An optical pickup for use with a recording medium comprising:
a light generation/detection unit to generate and emit a light beam and receive and detect the light beam reflected from a recording surface of the recording medium;
an objective lens to form a light spot on the recording surface of the recording medium by focusing the light beam incident from the light generation/detection unit;
an actuator to actuate the objective lens in a focusing and/or tracking direction; and
a reflection prism formed as a single body with a plurality of reflection faces, to guide the light beam incident through a transmission face of the reflection prism, and emitted from the light generation/detection unit, in a first direction perpendicular to a second direction, by reducing a size of the light beam in the second direction while the light beam passes adjacent a bottom of the actuator by using a difference in angles between reflection faces of the reflection prism, and to reflect the guided light beam by using a reflection face of an angle less than 45° with respect to the first direction to emit the reflected light beam toward the objective lens;
wherein the reflection prism comprises;
a first reflection face to reflect the light beam incident through the transmission face downward at an inclined angle with respect to the first and second directions;
a plurality of waveguide reflection faces to guide the light beam, after having been reflected from the first reflection face, by reducing the size of the light beam in the second direction; and
a second reflection face, which has an angle less than 45° with respect to the first direction, to reflect the light beam guided by the plurality of waveguide reflection faces toward the objective lens.

15. The optical pickup of claim 14, wherein the light generation/detection unit comprises:
a light source to generate and emit the light beam at a predetermined wavelength;
a photodetector to receive the light beam emitted from the light source and reflected from the recording surface of the recording medium; and
an optical path changer to change a traveling path of the light beam such that the light beam emitted from the light source proceeds toward the recording medium and such that the light beam reflected from the recording surface of the recording medium proceeds toward the photodetector.

16. The optical pickup of claim 15, wherein the predetermined wavelength of the light beam generated and emitted by the light source is 650 nm or less.

17. The optical pickup of claim 15, wherein the optical path changer is of a beam splitter type.

18. The optical pickup of claim 15, wherein the optical path changer is a hologram optical element which selectively transmits straight or diffracts/transmits the light beam depending on the direction from which the light beam is incident, with the light source, the photodetector, and the optical path changer being integrated into a light module.

19. The optical pickup of claim 15, wherein the light beam emitted from the light generation/detection unit is incident on the transmission face of the reflection prism such that a base line of the light beam is close to a base of the transmission face of the reflection prism.

20. The optical pickup of claim 14, wherein the light generation/detection unit comprises:
a plurality of light sources, each of which emits a light beam of a different wavelength;
a plurality of photodetectors, each of which receives a corresponding light beam emitted from one of the plurality of light sources and reflected from the recording surface of the recording medium; and
an optical path changing unit to change a traveling path of the light beam such that the light beam emitted from one of the plurality of light sources proceeds toward the recording medium and such that the light beam reflected from the recording surface of the recording medium proceeds toward a corresponding photodetector, and
wherein the optical pickup is compatible with recording media of different formats.

21. The optical pickup of claim 20, wherein the plurality of light sources comprises a first light source to emit a light beam of a relatively short wavelength and a second light source to emit a light beam of a relatively long wavelength, the plurality of photodetectors comprises a first photodetector to detect the light beam emitted from the first light source and reflected from a recording surface of a first one of the recording media and a second photodetector to detect the light beam emitted from the second light source and reflected from the recording surface of a second one of the recording media, and the optical path changing unit comprises a first optical path changer to change the traveling path of the light beam emitted from the first light source, a second optical path changer to change the traveling path of the light beam emitted from the second light source, and a third optical path changer to change traveling paths of the light beams emitted from the first and second light sources.

22. The optical pickup of claim 21, wherein the first light source emits the light beam having a wavelength of about 650 nm, and the second light source emits the light beam having a wavelength of about 780 nm.

23. The optical pickup of claim 22, wherein the optical pickup is compatible with CD family recording media and DVD family recording media.

24. The optical pickup of claim 21, wherein the first and second optical path changers comprise a hologram optical element which selectively transmits straight or diffracts/transmits the light beam according to the direction from which the light beam is incident, the first light source, the first photodetector, with the first optical path changer being integrated into a light module, and the second light source, the second photodetector, and the second optical path changer being integrated into a light module.

25. The optical pickup of claim 21, wherein the third optical path changer is a wavelength selective beam splitter which selectively transmits or reflects the light beams emitted from the first and second light sources according to the wavelength of the light beams.

26. The optical pickup of claim 21, wherein the optical pickup is compatible with CD family recording media and DVD family recording media.

27. The optical pickup of claim 20, wherein the optical pickup is compatible with CD family recording media and DVD family recording media.

28. The optical pickup of claim 20, wherein the light beam emitted from the light generation/detection unit is incident on the transmission face of the reflection prism such that a base line of the light beam is close to a base of the transmission face of the reflection prism.

29. The optical pickup of claim 14, wherein the optical pickup is compatible with CD family recording media and DVD family recording media.

30. The optical pickup of claim 14, wherein the second reflection face has an angle in a range from 20° to about 40° with respect to the first direction.

31. The optical pickup of claim 14, wherein the plurality of waveguide reflection surfaces are parallel to each other and to the first direction.

32. The optical pickup of claim 31, wherein the first reflection face reflects the light beam incident through the transmission face at an angle with respect to the first direction satisfying a total reflection condition.

33. The optical pickup of claim 32, wherein the first reflection face reflects the light beam, incident thereon through the transmission face, at an angle with respect to the second direction such that the light beam reflected from the first reflection face is incident on one of the waveguide reflection face at an angle satisfying the total reflection condition.

34. The optical pickup of claim 31, wherein the first reflection face reflects the light beam, incident thereon through the transmission face, at an angle with respect to the second direction such that the light beam reflected from the first reflection face is incident on one of the waveguide reflection face at an angle satisfying the total reflection condition.

35. The optical pickup of claim 14, wherein the first reflection face reflects the light beam, incident thereon through the transmission face, at an angle with respect to the first direction satisfying a total reflection condition.

36. The optical pickup of claim 35, wherein the first reflection face reflects the light beam, incident thereon through the transmission face, at an angle with respect to the second direction such that the light beam reflected from the first reflection face is incident on one waveguide reflection face at an angle satisfying the total reflection condition.

37. The optical pickup of claim 14, wherein the first reflection face reflects the light beam, incident thereon through the transmission face, at an angle with respect to the second direction such that the light beam reflected from the first reflection face is incident on one of the waveguide reflection face at an angle satisfying the total reflection condition.

38. The optical pickup of claim 14, wherein a light beam is perpendicularly incident on the transmission face.

39. The optical pickup of claim 14, wherein a light beam is perpendicularly incident on the transmission face.

40. The optical pickup of claim 14, wherein a distance between the plurality of waveguide reflection faces is smaller than a diameter of the light beam incident through the transmission face from the light generation/detection unit.

41. The optical pickup of claim 14, wherein at least a portion of the objective lens is disposed lower than a portion of the light beam emitted from the light generation/detection unit and incident on the reflection prism.

42. The optical pickup of claim 14, wherein the light beam emitted from the light generation/detection unit is incident on the transmission face of the reflection prism such that a base line of the light beam is close to the base of a transmission face of the reflection prism.

43. The optical pickup of claim 14, wherein the plurality of waveguide reflection faces are parallel to each other and guide the light beam, after having been reflected from the first reflection face, in the first direction perpendicular to the second direction.

44. An optical pickup compatible with recording media having a plurality of formats, the optical pickup, comprising:
a light generation/detection unit to generate and emit light beams of a plurality of wavelengths and receive and detect the light beams reflected from a recording surface of the recording media;
an objective lens to form a light spot on the recording surface of a recording medium by focusing the light beam incident from the light generation/detection unit;
an actuator to actuate the objective lens in a focusing and/or tracking direction; and
a compound reflection prism, which includes a plurality of prisms, to guide the light beam, incident from the light generation/detection unit, in a first direction perpendicular to a second direction by reducing a size of the light beam in the second direction while the light beam passes adjacent a bottom of the actuator by using a difference in angles between faces of the plurality of prisms, and to reflect the guided light beam by one prism face of an angle less than 45° with respect to the first direction to emit the reflected light beam toward the objective lens.

45. The optical pickup of claim 44, wherein the light generation/detection unit comprises:
a plurality of light sources, each of which emits a light beam of a different wavelength;
a plurality of photodetectors, each of which receive the light beam emitted from a corresponding light source and reflected from the recording surface of a corresponding one of the recording media; and
an optical path changing unit to change a traveling path of the light beam such that the light beam emitted from one of the plurality of light sources proceeds toward the recording medium and such that the light beam reflected from the recording surface of the corresponding recording medium proceeds toward a corresponding one of the photodetectors, and
wherein the optical pickup is compatible with the recording media having different formats.

46. The optical pickup of claim 45, wherein the plurality of light sources comprise a first light source to emit a light beam of a relatively short wavelength and a second light source to emit a light beam of a relatively long wavelength, the plurality of photodetectors comprise a first photodetector to detect the light beam emitted from the first light source and reflected from the recording surface of the corresponding recording media and a second photodetector to detect the light beam emitted from the second light source and reflected from the recording surface of the corresponding recording media, and the optical path changing unit comprises a first optical path changer to change the traveling path of the light beam emitted from the first light source, a second optical path changer to change the traveling path of the light beam emitted from the second light source, and a third optical path changer to change the traveling paths of the light beams emitted from the first and second light sources.

47. The optical pickup of claim 46, wherein the first light source emits the light beam having a wavelength of about 650 nm, and the second light source emits the light beam having a wavelength of about 780 nm.

48. The optical pickup of claim 46, wherein the first and second optical path changers comprise a hologram optical element which selectively transmits straight or diffracts/ transmits the light beam according to the direction from which the light beam is incident, with the first light source, the first photodetector, and the first optical path changer being integrated into a light module, and the second light source, the second photodetector, and the second optical path changer being integrated into another light module.

49. The optical pickup of claim 46, wherein the third optical path changer is a wavelength selective beam splitter which selectively transmits or reflect the light beams emitted from the first and second light sources according to the wavelength of the light beams.

50. The optical pickup of claim 46, wherein the optical pickup is compatible with CD family recording media and DVD family recording media.

51. The optical pickup of claim 44, wherein the compound reflection prism comprises:
 a first prism having a first transmission face and a first face to reflect the light beam incident through the first transmission face downward at an inclined angle with respect to the first and second directions; and
 a second prism having second and third faces, which are arranged in the second direction spaced a predetermined distance that is smaller than a diameter of the light beam incident on the first transmission face, to alternately reflect the light beam incident thereon after having been reflected from the first face, and a fourth face which has an angle less than 45° with respect to the first direction, to reflect the light beam incident thereon after having been reflected from the third face.

52. The optical pickup of claim 51, wherein the fourth face of the second prism has an angle in the range of from about 20° to about 40° with respect to the first direction.

53. The optical pickup of claim 52, wherein the second prism is a rhomboidal prism where the second, third, and fourth faces and an opposite face to the fourth face form a rhombus structure.

54. The optical pickup of claim 52, wherein the first and second prisms are constructed such that total internal reflection occurs at the first, second, and third faces.

55. The optical pickup of claim 52, wherein the fourth face of the second prism is a totally reflective surface.

56. The optical pickup of claim 51, wherein the second and third faces of the second prism are parallel to each other.

57. The optical pickup of claim 56, wherein the second prism is a rhomboidal prism where the second, third, and fourth faces and an opposite face to the fourth face form a rhombus structure.

58. The optical pickup of claim 56, wherein the fourth face of the second prism is a totally reflective surface.

59. The optical pickup of claim 51, wherein the second prism is a rhomboidal prism where the second, third, and fourth faces and an opposite face to the fourth face form a rhombus structure.

60. The optical pickup of claim 59, wherein the first and second prisms are constructed such that total internal reflection occurs at the first, second, and third faces.

61. The optical pickup of claim 51, wherein the compound reflection prism further comprises a third prism between the first and second prisms which allows the light beam reflected from the first face of the first prism to proceed straight and enter the second prism.

62. The optical pickup of claim 61, wherein the third prism is a triangular prism having a right triangular structure.

63. The optical pickup of claim 51, wherein the first prism is a triangular prism having an isosceles triangular structure oriented at a predetermined angle with respect to the first direction.

64. The optical pickup of claim 63, wherein the fourth face of the second prism is a totally reflective surface.

65. The optical pickup of claim 51, wherein the first and second prisms are constructed such that total internal reflection occurs at the first, second, and third faces.

66. The optical pickup of claim 51, wherein the fourth face of the second prism is a totally reflective surface.

67. The optical pickup of claim 44, wherein at least a portion of the objective lens is disposed lower than a portion of the light beam emitted from the light generation/detection unit and incident on the compound reflection prism.

68. A method of using an optical pickup compatible with a recording medium, the medium comprising:
 emitting a light beam to a transmission face of a reflection prism so that the light beam is incident through the transmission face;
 reflecting the light beam incident through the transmission face downward at an inclined angle with respect to first direction perpendicular to second direction by using a first reflection face of the reflection prism;
 guiding the light beam reflected from the first reflection face in the first direction perpendicular to the second direction by reducing a size of the light beam in the second direction by using a difference in angles between a plurality of waveguide reflection faces of the reflection prism;
 reflecting the light beam guided by the plurality of waveguide reflection faces in the second direction by using a second reflection face of the reflection prism having an angle of less than 45° with respect to the first direction so that the light beam reflected from the second reflection face is emitted from the reflection prism;
 forming a light spot on the recording surface of the recording medium by focusing the light beam emitted from the reflection prism; and
 detecting the light beam reflected from a recording surface of the recording medium.

69. The method of claim 68, wherein the emitting of the light beam to the transmission face of the reflection prism further comprises: emitting a light beam from any one of a plurality of light sources, each of a different wavelength; and changing a traveling path of the light beam, as emitted from the any one light sources, such that the light beam proceeds toward the transmission face of the reflection prism; and
 wherein the detecting of the light beam comprises changing a traveling path of the light beam, as reflected from the recording surface of the recording medium, to proceed toward one of a plurality of photodetectors.

70. The method of claim 68, wherein the plurality of waveguide reflection faces are parallel to each other; and
 wherein the guiding of the light beam comprises guiding the light beam reflected from the first reflection face of the reflection prism in the first direction perpendicular to the second direction using the plurality of waveguide reflection faces that are parallel to each other.

71. A method of using an optical pickup compatible with a recording medium, comprising:
 emitting a light beam to a compound reflection prism, which includes a plurality of prisms;
 guiding the light beam, incident through a transmission face of the compound reflection prism, in a first direction perpendicular to a second direction by reducing a size of the light beam in the second direction by using a difference in angles between faces of a plurality of prisms in the compound reflection prism, and reflecting the guided light beam in the second direction by one prism face of an angle less than 45° with respect to the first direction;

forming a light spot on the recording surface of the recording medium by focusing the light beam emitted from the compound reflection prism; and detecting the light beam reflected from a recording surface of the recording medium.

72. The method of claim 71, wherein the emitting of the light beam to the compound reflection prism further comprises:

emitting a light beam from any one of a plurality of light sources, each of a different wavelength; and changing a traveling path of the light beam, as emitted from the any one of the light sources, such that the light beam proceeds toward the compound reflection prism, and changing the traveling path of the light beam, as emitted from the compound reflection prism and reflected from the recording surface of the recording medium, to proceed toward one of a plurality of photodetectors.

73. The method of claim 71, wherein the compound reflection prism includes a plurality of waveguide reflection faces that are parallel to each other; and wherein the guiding of the light beam, incident through the transmission face of the compound reflection prism, in the first direction perpendicular to the second direction comprises guiding the light beam, incident through the transmission face of the compound reflection prism, in the first direction perpendicular to the second direction with the waveguide reflection faces that are parallel to each other.

* * * * *